United States Patent
Zhao et al.

(10) Patent No.: US 12,354,600 B2
(45) Date of Patent: Jul. 8, 2025

(54) FAST AND EFFICIENT TEXT ONLY ADAPTATION FOR FACTORIZED NEURAL TRANSDUCER

(71) Applicant: MICROSOFT TECHNOLOGY LICENSING, LLC, Redmond, WA (US)

(72) Inventors: Rui Zhao, Bellevue, WA (US); Jian Xue, Bellevue, WA (US); Sarangarajan Parthasarathy, Mountain View, CA (US); Jinyu Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 17/983,660

(22) Filed: Nov. 9, 2022

(65) Prior Publication Data
US 2024/0135919 A1    Apr. 25, 2024

Related U.S. Application Data

(60) Provisional application No. 63/416,892, filed on Oct. 17, 2022.

(51) Int. Cl.
*G10L 15/16* (2006.01)
*G10L 15/06* (2013.01)
*G10L 15/197* (2013.01)
*G10L 15/22* (2006.01)

(52) U.S. Cl.
CPC ........... *G10L 15/16* (2013.01); *G10L 15/063* (2013.01); *G10L 15/197* (2013.01); *G10L 15/22* (2013.01)

(58) Field of Classification Search
CPC ..... G10L 15/16; G10L 15/063; G10L 15/197; G10L 15/22; G10L 15/065; G10L 15/183; G06N 3/045; G06N 3/096
See application file for complete search history.

(56) References Cited

U.S. PATENT DOCUMENTS

2023/0153601 A1* 5/2023 Fukuda ................. G06N 3/084
706/15

OTHER PUBLICATIONS

Chen et al, Factorized Neural Transducer for Efficient Language Model Adaptation, Oct. 7, 2021, https://arxiv.org/abs/2110.01500, pp. 1-5 (Year: 2021).*

(Continued)

*Primary Examiner* — Linda Wong
(74) *Attorney, Agent, or Firm* — Workman Nydegger

(57) ABSTRACT

Systems and methods are provided for accessing a factorized neural transducer comprising a first set of layers for predicting blank tokens and a second set of layers for predicting vocabulary tokens, the second set of layers comprising a language model that includes a vocabulary predictor which is a separate predictor from the blank predictor, wherein a vocabulary predictor output from the vocabulary predictor and the encoder output are used for predicting a vocabulary token. The second set of layers is selectively modified to facilitate an improvement in an accuracy of the factorized neural transducer in performing automatic speech recognition, the selectively modifying comprising applying a particular modification to the second set of layers while refraining from applying the particular modification to the first set of layers.

16 Claims, 10 Drawing Sheets

Factorized Neural Transducer

(56) References Cited

OTHER PUBLICATIONS

Bahdanau, et al., "End-To-End Attention-Based Large Vocabulary Speech Recognition", In Proceedings of IEEE International Conference on Acoustics, Speech and Signal Processing, Mar. 20, 2016, pp. 4945-4949.

Bahdanau, et al., "Neural Machine Translation by Jointly Learning to Align and Translate", In Proceedings of International Conference on Learning Representations, May 7, 2015, pp. 1-15.

Battenberg, et al., "Exploring Neural Transducers For End-To-End Speech Recognition", In Proceedings of IEEE Automatic Speech Recognition and Understanding Workshop, Dec. 16, 2017, pp. 206-213.

Chan, et al., "Listen, Attend And Spell: A Neural Network For Large Vocabulary Conversational Speech Recognition", In Proceedings of IEEE international conference on acoustics, speech and signal processing, Mar. 20, 2016, pp. 4960-4964.

Chiu, et al., "Monotonic Chunkwise Attention", Retrieved From: arXiv:1712.05382v1, Dec. 14, 2017, 13 Pages.

Chiu, et al., "State-Of-The-Art Speech Recognition With Sequence-To-Sequence Models", In Proceedings of IEEE International Conference on Acoustics, Speech and Signal Processing, Apr. 15, 2018, pp. 4774-4778.

Cho, et al., "Learning Phrase Representations using RNN Encoder-Decoder for Statistical Machine Translation", In Proceedings of Empirical Methods in Natural Language Processing, Jan. 1, 2014, pp. 1724-1734.

Chorowski, et al., "Attention-Based Models for Speech Recognition", In Journal of Advances in neural information processing systems, vol. 28, Dec. 2015, 9 Pages.

Das, et al., "Advancing Acoustic-to-Word CTC Model With Attention and Mixed-Units", In Proceedings of IEEE/ACM Transactions on Audio, Speech, and Language Processing, vol. 27, Issue 12, Dec. 2019, pp. 1880-1892.

Graves, et al., "Connectionist Temporal Classification: Labelling Unsegmented Sequence Data with Recurrent Neural Networks", In Proceedings of the 23rd international conference on Machine learning, Jun. 25, 2006, 8 Pages.

Graves, Alex, "Sequence Transduction with Recurrent Neural Networks", Retrieved From: https://arxiv.org/abs/1211.3711, Nov. 14, 2012, 9 Pages.

Graves, et al., "Speech Recognition With Deep Recurrent Neural Networks", In Proceedings of IEEE international conference on acoustics, speech and signal processing, May 26, 2013, pp. 6645-6649.

Graves, et al., "Towards End-to-End Speech Recognition with Recurrent Neural Networks", In Proceedings of International conference on machine learning, Jun. 18, 2014, 9 Pages.

Hadian, et al., "Towards Discriminatively-trained HMM-based End-to-end models for Automatic Speech Recognition", In Proceedings of international conference on acoustics, speech and signal processing, 2018.

He, et al., "Streaming End-To-End Speech Recognition For Mobile Devices", In Proceedings of IEEE International Conference on Acoustics, Speech and Signal Processing, May 12, 2019, pp. 6381-6385.

Hinton, et al., "Deep Neural Networks for Acoustic Modeling in Speech Recognition", In Journal of IEEE Signal processing magazine, vol. 29, Issue 6, Oct. 15, 2012, pp. 82-97.

Kannan, et al., "Large-Scale Multilingual Speech Recognition with a Streaming End-to-End Model", Retrieved From: arXiv:1909.05330v1, Sep. 11, 2019, 5 Pages.

Li, et al., "Advancing Acoustic-To-Word Ctc Model", In Proceedings of IEEE International Conference on Acoustics, Speech and Signal Processing, Apr. 15, 2018, pp. 5794-5798.

Li, et al., "Improving Rnn Transducer Modeling For End-To-End Speech Recognition", In Proceedings of IEEE Automatic Speech Recognition and Understanding Workshop, Dec. 14, 2019, pp. 114-121.

Miao, et al., "Eesen: End-To-End Speech Recognition Using Deep Rnn Models And Wfst-Based Decoding", In Proceedings of IEEE Workshop on Automatic Speech Recognition and Understanding, Dec. 13, 2015, pp. 167-174.

Moritz, et al., "Triggered Attention for End-to-End Speech Recognition", In Proceedings of IEEE International Conference on Acoustics, Speech and Signal Processing, May 12, 2019, pp. 5666-5670.

Prabhavalkar, et al., "A Comparison of Sequence-to-Sequence Models for Speech Recognition", In Proceedings of Interspeech, Aug. 20, 2017, pp. 939-943.

Rao, et al., "Exploring Architectures, Data And Units For Streaming End-To-End Speech Recognition With Rnn-Transducer", In Proceedings of IEEE Automatic Speech Recognition and Understanding Workshop, Dec. 16, 2017, pp. 193-199.

Sainath, et al., "Improving The Performance Of Online Neural Transducer Models", In Proceedings of IEEE International Conference on Acoustics, Speech and Signal Processing, Apr. 15, 2018, pp. 5864-5868.

Sak, et al., "Learning Acoustic Frame Labeling For Speech Recognition With Recurrent Neural Networks", In Proceedings of IEEE international conference on acoustics, speech and signal processing, Apr. 19, 2015, 5 Pages.

Sak, et al., "Recurrent Neural Aligner: An Encoder-Decoder Neural Network Model for Sequence to Sequence Mapping", In Proceedings of Interspeech, vol. 8, Aug. 20, 2017, pp. 1298-1302.

Seide, et al., "Conversational Speech Transcription Using Context-Dependent Deep Neural Networks", In 12th Annual Conference of the International Speech Communication Association, Aug. 27, 2011, pp. 437-440.

Sennrich, et al., "Neural Machine Translation of Rare Words with Subword Units", Retrieved From: arXiv:1508.07909v1, Aug. 31, 2015, 11 Pages.

Wang, et al., "Exploring Rnn-Transducer For Chinese Speech Recognition", In Journal of Computing Research Repository, Nov. 13, 2018, 5 Pages.

Wu, et al., "Google's Neural Machine Translation System: Bridging the Gap between Human and Machine Translation", Retrieved From: arXiv:1609.08144v1, Sep. 26, 2016, 23 Pages.

Chen, et al., "Factorized Neural Transducer for Efficient Language Model Adaptation", In Proceedings of ICASSP IEEE International Conference on Acoustics, Speech and Signal Processing, May 23, 2022, pp. 8132-8136.

International Search Report and Written Opinion received for PCT Application No. PCT/US23/031795, mailed on Nov. 24, 2023, 17 pages.

Li, et al., "Recent Advances in End-to-End Automatic Speech Recognition", Arxiv Cornell University Library, Feb. 2, 2022, 27 pages.

Zhao, et al., "Fast and Accurate Factorized Neural Transducer for Text Adaption of End—to—End Speech Recognition Models", IEEE International Conference on Acoustics, Jun. 4, 2023, 5 pages.

U.S. Appl. No. 63/416,892, filed Oct. 17, 2022.

* cited by examiner

FAST AND EFFICIENT TEXT ONLY ADAPTATION FOR FACTORIZED NEURAL TRANSDUCER

CROSS-REFERENCE TO RELATED APPLICATIONS

This application claims the benefit of and priority to U.S. Provisional Patent Application Ser. No. 63/416,892 filed on Oct. 26, 2022, and entitled "FAST AND EFFICIENT TEXT ONLY ADAPTATION FOR FACTORIZED NEURAL TRANSDUCER," which application is expressly incorporated herein by reference in its entirety.

BACKGROUND

Automatic speech recognition (ASR) systems and other speech processing systems are used to process and decode audio data to detect speech utterances (e.g., words, phrases, and/or sentences). The processed audio data is then used in various downstream tasks such as search-based queries, speech to text transcription, language translation, etc. There are many different types of ASR systems that are being explored. For example, end-to-end (E2E) ASR systems, such as connectionist temporal classification (CTC), attention-based encoder-decoder, and transducers each work to transfer acoustic features to text sequences. In some instances, the ASR system needs to be adapted for a new domain, in addition to being trained in a general baseline domain.

However, one of the main challenges of conventional transducer-based ASR systems is that the ASR system must be adapted using robust adaptation data comprising speech data with corresponding speech labels. This is computationally and time expensive to collect new audio data for the new domain and generate corresponding speech labels. Additionally, because of the integrated nature of predicting the blank token and vocabulary token of the neural transducer, the entire ASR system must be adapted using the new adaptation data. This is also computationally expensive for updating all the layers of the ASR system.

Additionally, in some instances, when the ASR system is adapted to a new domain, the ASR system decreases in accuracy for performing speech recognition in the baseline domain, even though it has realized an improvement in accuracy for recognizing speech in the new domain. In view of the foregoing, there is a need for improved methods and systems for adapting an ASR system to a new domain and performing automatic speech recognition using the adapted ASR system.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems and methods for performing speech recognition. In particular, systems and methods are provided for compiling and/or modifying a machine learning model, such as factorized neural transducer, to improving the accuracy of the machine learning model, particularly in performing speech recognition for a new domain. Additionally, systems and methods are provided for processing new domain and/or a combination of new domain and baseline speech data.

Disclosed embodiments are provided for modifying a factorized neural transducer to perform automatic speech recognition. Some of the disclosed systems, for example, access a factorized neural transducer comprising a first set of layers for predicting blank tokens and a second set of layers for predicting vocabulary tokens, wherein the second set of layers has been modified to facilitate an improvement in an accuracy of the factorized neural transducer in performing automatic speech recognition. The first set of layers comprising a blank predictor, an encoder, and a joint network, wherein a blank predictor output from the blank predictor and an encoder output from the encoder are processed by the joint network for predicting a blank token, and the second set of layers comprising a language model that comprises a vocabulary predictor which is a separate predictor from the blank predictor, wherein a vocabulary predictor output from the vocabulary predictor and the encoder output are used for predicting a vocabulary token.

The systems receive electronic content comprising speech data as input to the factorized neural transducer, predict a blank token and a vocabulary token for a particular portion of the speech data, and using the blank token and the vocabulary token to perform speech recognition on the speech data.

Some disclosed embodiments are also directed to systems and methods for selectively modifying the factorized neural transducer. For example, systems access a factorized neural transducer comprising a first set of layers for predicting blank tokens and a second set of layers for predicting vocabulary tokens. The first set of layers comprising a blank predictor, an encoder, and a joint network, wherein a blank predictor output from the blank predictor and an encoder output from the encoder are processed by the joint network for predicting a blank token, and the second set of layers comprising a language model that includes a vocabulary predictor which is a separate predictor from the blank predictor, wherein a vocabulary predictor output from the vocabulary predictor and the encoder output are used for predicting a vocabulary token. The systems then selectively modify the second set of layers to facilitate an improvement in an accuracy of the factorized neural transducer in performing automatic speech recognition, the selectively modifying comprising applying a particular modification to the second set of layers while refraining from applying the particular modification to the first set of layers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS AND REFERENCE TO APPENDIX

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be limiting in scope, embodiments will be described and explained with additional specificity and detail through the use of the accompanying drawings in which.

DETAILED DESCRIPTION

Disclosed embodiments are directed towards improved systems, methods, and frameworks for modifying and using a factorized neural transducer.

The disclosed embodiments may be utilized to realize many technical benefits and advantages over conventional systems and methods for performing speech recognition, as well as for generating and modifying machine learning models that are capable of performing speech recognition. The technical benefits and advantages that may be realized, for example, include the ability to As described herein, various embodiments are also provided for further modifying factorized neural transducers to obtain even greater accuracy when performing ASR tasks. The disclosed additional modifications that can be made to the factorized neural transducers include, but are not limited to: (1) implementing CTC criterion into the training process to provide for faster, more efficient training processes, with improved prediction functionality; (2) combining the encoder output and vocabulary predictor output prior to generating the vocabulary token prediction to allow learned acoustic information to improve the prediction of the vocabulary token; (3) applying a KL divergence processing between the output of the baseline language model of the factorized neural transducer and the output of the adapted language model of the factorized neural transducer to mitigate degradation of the factorized neural transducer recognizing speech in the baseline domain after being adapted to the new domain; (4) interpolating output from the language model of the factorized neural transducer and an N-gram model during run-time of the factorized neural transducer to facilitate an improvement in predicting vocabulary tokens for speech associated with a new domain; and (5) replacing in the baseline language model of the factorized neural transducer with an external language model. The foregoing benefits are especially pronounced in ASR applications requiring fast adaptation, such as in real-time and/or streaming audio scenarios.

Conventional Neural Transducers

Figure 1:
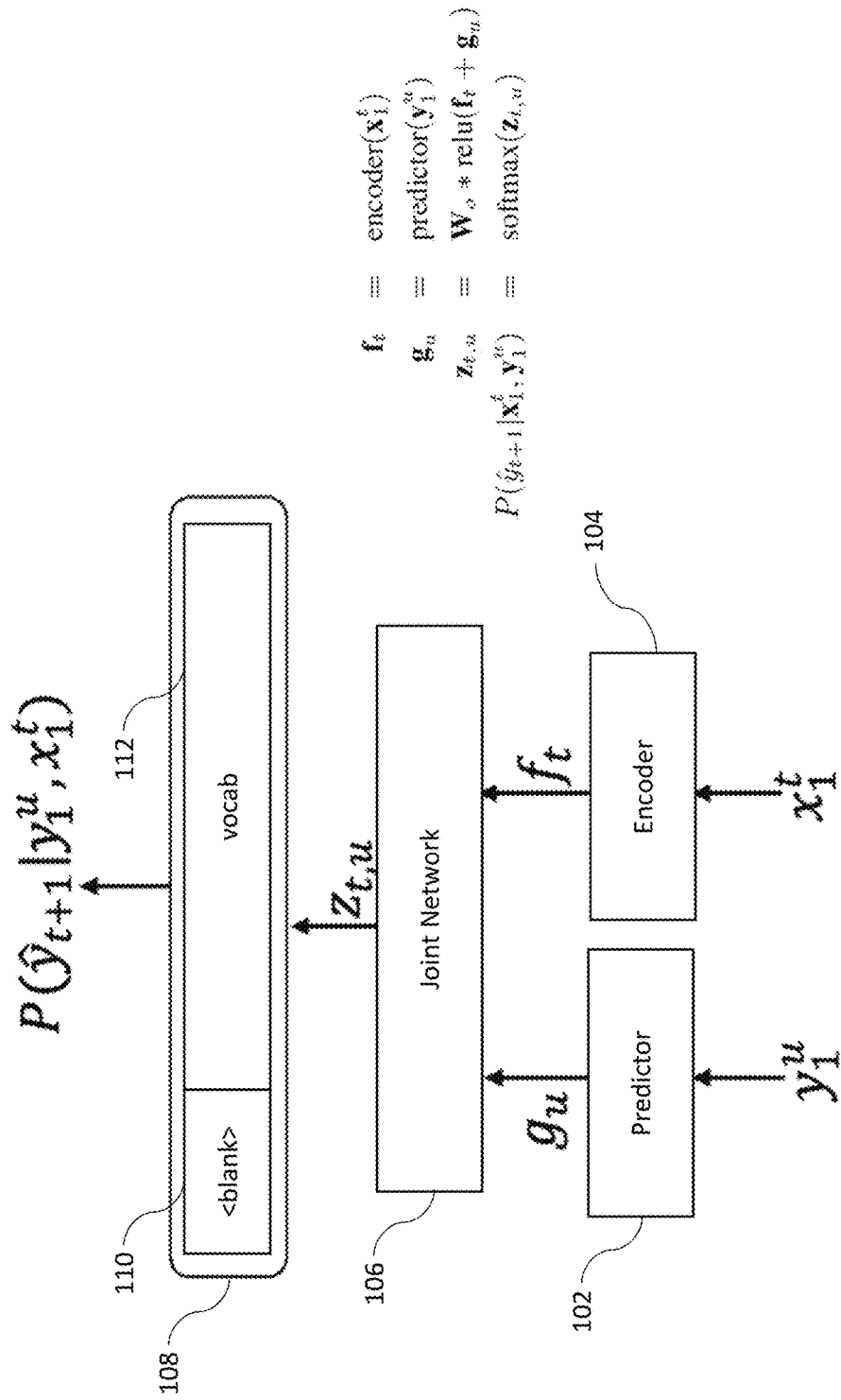
FIG. 1 illustrates an example embodiment of a conventional neural transducer.

Attention will first be directed to FIG. 1, which illustrates an example embodiment of a conventional neural transducer configured to perform speech recognition on speech input. As illustrated, the conventional neural transducer comprises a predictor 102, an encoder 104, and a joint network 106. The predictor takes input (e.g., "y") comprising a previously predicted non-blank output (e.g., historical label sequence) to generate a prediction output (e.g., "g"), which is a label representation. The encoder takes input (e.g., "x") comprising acoustic features associated with a portion of speech data to generate an encoder output (e.g., "f"), which is an acoustic representation. The joint network generates a joint output (e.g., "z") based on the prediction output and the encoder output. The joint output is then used to generate a final prediction 108 for a corresponding portion of speech data, which includes a blank token 110 and vocabulary token 112, which results in a probability distribution over the output layer. Notably, the predictor 102 is configured in the conventional model to predict both the blank token 110 as well as the vocabulary token 112, such that the training and results of the two types of potential tokens are tied together.

In order to address the length differences between the acoustic feature and label sequences, a special blank symbol is added to the output vocabulary to represent a null token. Each alignment contains a particular number of output tokens. The objective function of the transducer model is to minimize the negative log probability over all possible alignments.

In recent years, E2E based automatic speech recognition systems like the neural transducer illustrated in FIG. 1 have achieved success due to their simplicity and promising performance and are able to outperform traditional hybrid models in some scenarios. However, the joint optimization of the acoustic model and lexicon and language model in the neural transducer also brings significant challenges in adapting the ASR system. For example, neural transducers such as those illustrated in FIG. 1 must use adaptation training data that comprises audio-text pairs.

Conventional models, such as those referenced in FIG. 1, are not easily tuned/trained for new domains using only adaptation text. This makes adaptation tasks more costly, both in money spent curating the appropriate dataset and in computational processing, which must use the audio data along with the corresponding textual data to adapt an ASR system for new domains. In particular, conventional models must use the audio-text pairs because there are no individual acoustic and language models in conventional transducer modeling.

Notably, there are no individual acoustic and language models used for performing ASR tasks in the conventional neural transducer space. Additionally, although the predictor of the transducer looks similar to a language model in terms of model structure (i.e., an internal language model could be extracted from the predictor and joint network), it does not perform as a language model because the predictor needs to coordinate with the acoustic encoder closely during the training. Hence, it is not straightforward to utilize text-only data to adapt the model from a source domain to a target domain. This especially limits the ability to perform fast adaptation, for example, because the entire model must be adapted.

Additionally, when a conventional model attempts to adapt its neural transducer to new domain, it experiences significant degradation in its ability to perform speech recognition in the original domain due to the architecture and weighting applied by the neural transducer to the new domain.

The foregoing drawbacks have hindered the use of neural transducers in many different ASR applications. While there have been some efforts made to mitigate or solve these shortcomings, such approaches have been computationally expensive and are not practical for applications requiring fast adaptation.

Factorized Neural Transducer

In light of the foregoing limitations of conventional neural transducers, some disclosed embodiments are directed to an improved neural transducer which factorizes the blank and vocabulary prediction. This factorization allows for the language model portion (e.g., vocabulary prediction layers) of the factorized neural transducer to be adapted independently from the blank prediction layers. This disentangles the fusion of the language model and acoustic model typically experienced in traditional E2E models (i.e., conventional neural transducers) and allows for efficient language model adaptation and customization.

For example, because the factorized neural transducer has been optimized to allow the vocabulary prediction layers to behave more like a standalone language model, variety and number of adaptation techniques that can be applied is significantly increased. Additionally, the original benefits of using a transducer model, such as minimizing the negative log probability over all possible alignments of the output tokens is also realized in the factorized neural transducer.

Figure 2:
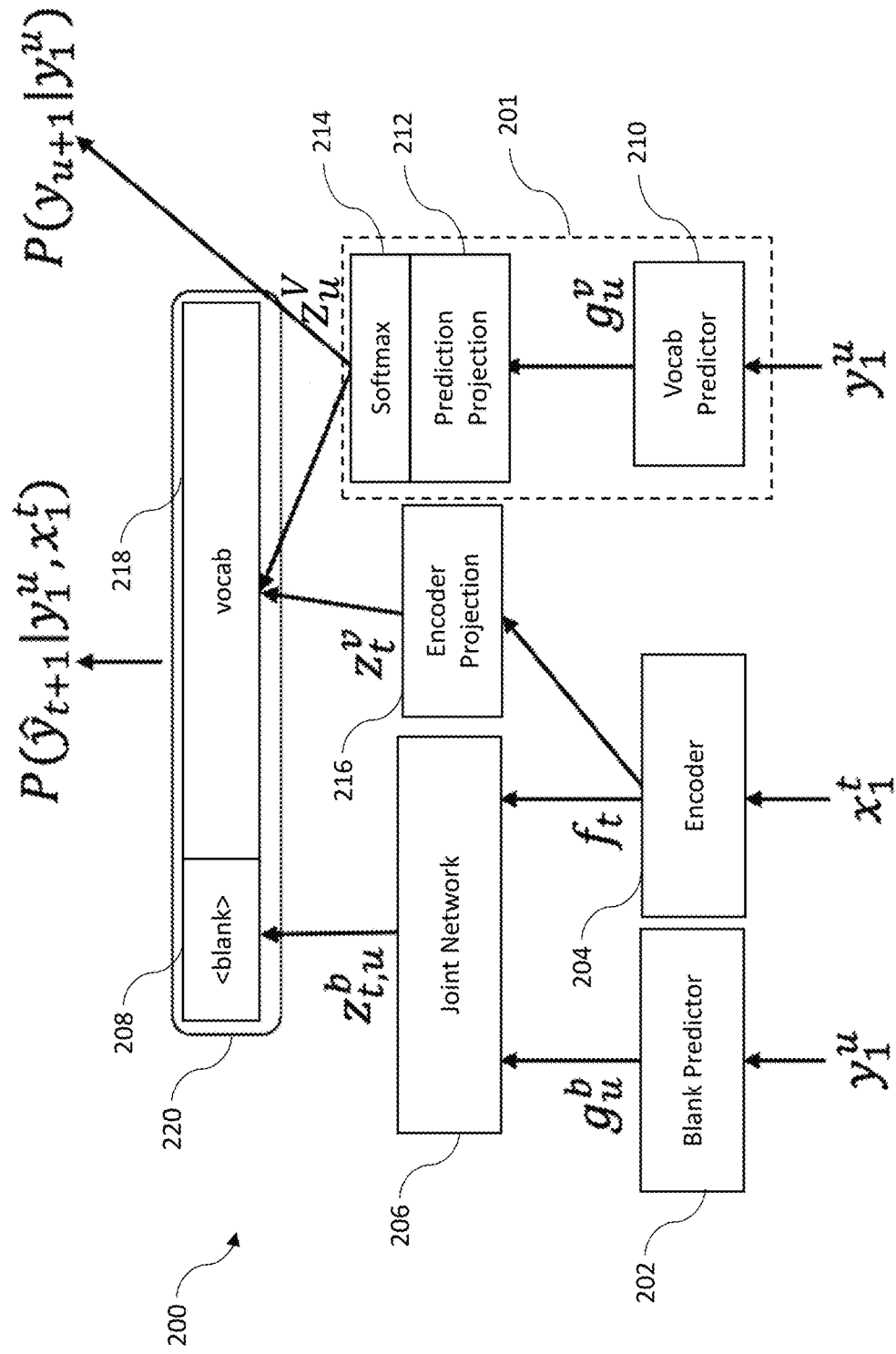
FIG. 2 illustrates an example embodiment of a factorized neural transducer.

Attention will now be directed to FIG. 2, which illustrates an example embodiment of a factorized neural transducer. As illustrated, the factorized neural transducer comprises a blank predictor 202, and encoder 204, a joint network 206, and a vocabulary predictor 210, which is functionally separated from the blank predictor 202 in the architecture of the factorized neural transducer.

In this factorized architecture, the blank token 208 and vocabulary token 218 are predicted separately, as part of the generation of the label output 220. For example, the blank predictor 202 generates a blank predictor output (e.g., "g") based on receiving a previously predicted non-blank label output ("y") and corresponding to a previous portion of speech data.

The encoder 204, meanwhile, generates an encoder output (e.g., "f") based on receiving a set of acoustic features (e.g., "x") extracted from a portion of speech data.

The joint network 206 generates a joint output (e.g., "z") based on the blank predictor output and the encoder output. The system is then able to predict the blank token 208 based on the joint network output.

For the prediction of the blank token, it is important to fuse the acoustic and label information as early as possible, thereby enabling the combination to occur at the joint network.

In series, or in parallel, with predicting the blank token, the factorized neural transducer also predicts the vocabulary token 218. For example, the vocabulary predictor 210 generates a vocabulary predictor output (e.g., "g"). Subsequently, a prediction projection layer 212 and a Softmax layer 214 are consecutively applied to the vocabulary predictor output in order to generate output "z". An encoder projection layer 216 is also applied to the encoder output in order to generate output "z". The system then predicts the vocabulary token 218 based on output "$z_l'$" and output "$z_u'$". Because of the factorization, the vocabulary predictor is allowed to behave like a language model, using history words as input and the log probability of each word as output.

By implementing an ASR system in this manner, it has been found that the factorized neural transducer can achieve 15.4% to 19.4% word error rate (WER) improvements, compared to conventional transducer ASR models, when out-of-domain text data is used for language model adaptation (e.g., when adapting the vocabulary prediction layers). Additionally, the current factorized neural transducer model is able to retain a similar WER as the original training stage on a general test set, with minimal degradation. This is an improvement over conventional models which experience a degradation in accuracy for the general testing set after adaptation to a new domain. Utilizing KL divergence reduces the degradation of the accuracy for the general test set in the factorized neural transducer model.

The system is configured to compute a transducer loss corresponding to the first set of layers which predict the blank token and layers which predict the vocabulary token. The objective function of the transducer model is to minimize the negative log probability over all possible alignments between the acoustic features and label sequences. The system is also configured to compute a language model loss, accounting for cross-entropy, corresponding to the second set of layers which predict the vocabulary token.

The loss function of the factorized neural transducer can be written as:

$$J_f = J_t - \lambda * \log P(y_1^U)$$

where the first term is the transducer loss, and the second term is the language model loss with cross entropy. Lambda is a hyper-parameter (i.e., weighting factor) to tune the effect of language model loss as it contributes to the loss function of the factorized neural transducer.

The vocabulary prediction network (e.g., the vocabulary predictor, prediction projection layer, and Softmax layer) generates an output that is the log probability over the vocabulary. Because the vocabulary prediction is allowed to function as a standalone language model, this internal language model can be replaced by any language model trained with the same vocabulary. There is no large matrix computation in the factorized neural transducer in the joint network as compared to the traditional neural transducer. As a result, the training speed and memory consumption is improved.

In the training stage, the factorized neural transducer is trained from scratch using a loss function. Thereafter, within the adaptation stage, the model can be further trained using any language model adaptation technique to adapt the vocabulary prediction network, including using text-only adaptation data. This is a great technical benefit since is it much easier to collect a large scale of text data than to collect labeled speech data.

Modified Factorized Neural Transducers

Implementing CTC Criterion

Some disclosed embodiments are also directed to further modifications of the factorized neural transducer, and which are specifically aimed at optimizing the factorized neural transducer for fast and efficient text only adaptation. In conventional neural transducers, the prediction network does not behave as a standalone language model, which limits its capability in being adapted to new domains. In contrast, by splitting out the language model from the architecture (i.e., factorizing), the factorized neural transducer can be more quickly and efficiently adapted to a new domain because the language model can be adapted without having to adapt model layers associated with predicting the blank token.

Figure 3:
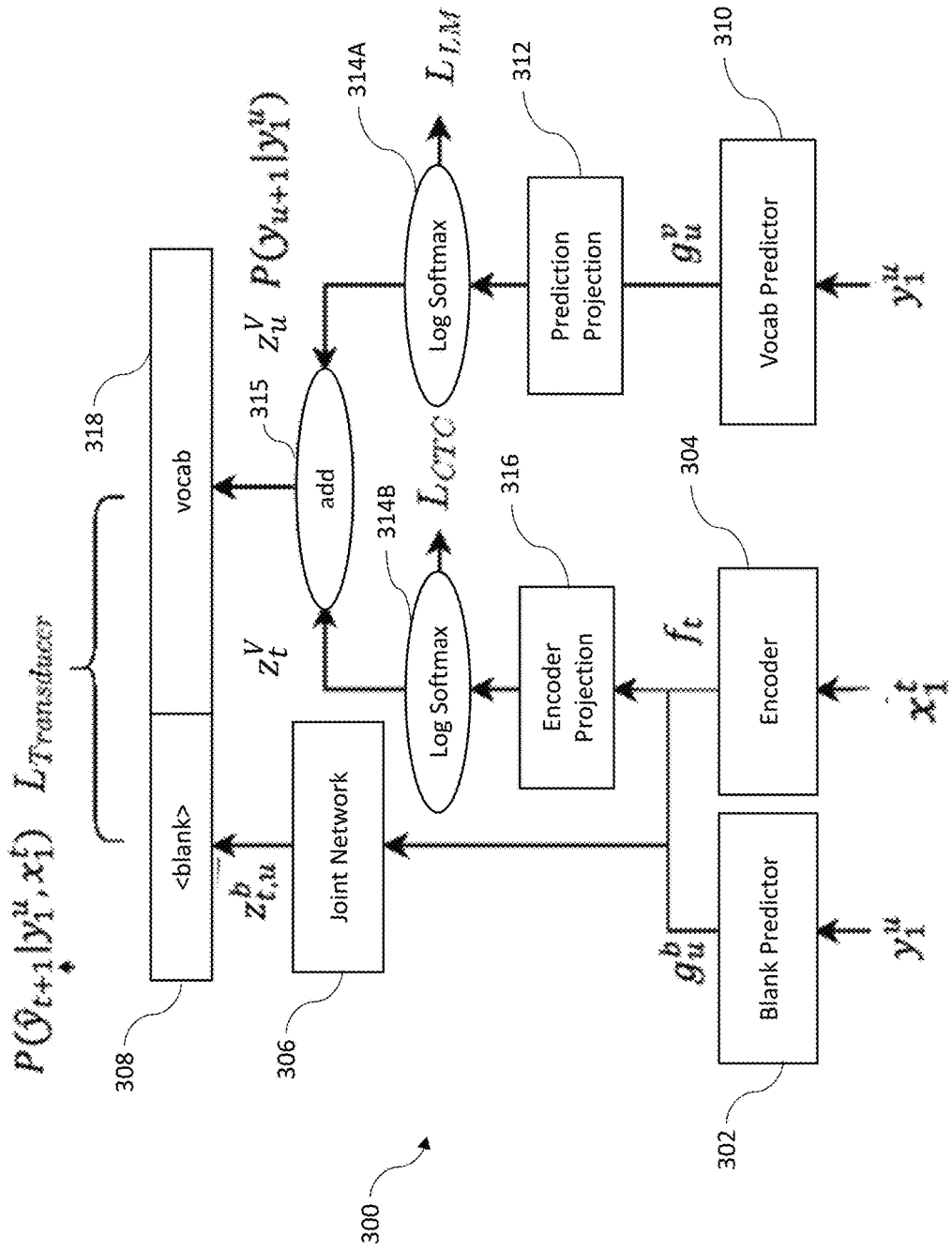
FIG. 3 illustrates an example of a modified factorized neural transducer using CTC criterion during training.

Attention will now be directed to FIG. 3, which illustrates an example of a factorized neural transducer that has been modified with CTC criterion to improve the training process of the factorized neural transducer. Similar to the factorized neural transducer illustrated in FIG. 2, the factorized neural transducer illustrated in FIG. 3, aims to separately predict blank tokens and normal tokens (i.e., vocabulary tokens), so that the prediction of normal tokens fully functions as a language model.

The model comprises four main parts, the encoder 304, the blank predictor 302, the joint network 306, and the vocabulary predictor 310. In some instances, the encoder 304 is an acoustic encoder, which consumes speech history (e.g., speech signal and/or audio data). Some modifications of the FNT model include an encoder projection layer 316 which is applied to the encoder output (i.e., acoustic representation). A log softmax layer 314B is also applied to the output of the encoder projection layer 316, in order to compute a probability distribution of the encoder projection layer output.

A prediction projection layer 312 and log softmax layer 314A are consecutively applied to the vocabulary predictor output. Because of the additional processing done by the projection layers and log softmax layers, the encoder output and vocabulary predictor output are now able to be combined (e.g., add layer 315) in order to facilitate an improved prediction of the vocabulary token 318. Notably, the blank token 308 is predicted in a similar manner as blank token 208, as described in reference to FIG. 2.

The additional processing is beneficial in allowing the different outputs to be combined because in the unmodified FNT model architecture the vocabulary predictor output (e.g., $z_t^V$) is a log probability, while the encoder output is not a log probability.

$$z_t^V = \log\_softmax(d_t^V)$$

According to Bayes' theorem, the acoustic and language model scores should be combined by weighted sum in the log probability domain. So, by converting the encoder output to a log probability by adding CTC criterion, the encoder output can be added with a weighted log probability of the vocabulary predictor output according to the following:

$$z_{t,u}^V = z_t^V + \gamma * z_u^V$$

In the above equations, $\gamma$ is the trainable language model weight.

The acoustic and label representations are fused in the following manner, in reference to the following equations which represent the functional processing of audio data within the different layers of the factorized neural transducer.

The blank token (e.g., $z_{t,u}^B$) is predicted by combining the acoustic representation, also referred to as the encoder output, (e.g., $h_t$) with the blank predictor output (e.g., $Pred^B$) which was generated by the blank predictor based on a previously predicted label (e.g., y≤u).

$$z_{t,u}^B = \text{Joint}(h_t, Pred^B(y \leq u))$$

After the vocabulary predictor generates the vocabulary predictor output (e.g., $Pred^V$) based on a previously predicted label (e.g., y≤u), a Softmax layer is applied to the vocabulary predictor output to generate the probability distribution for the vocabulary predictor output. This is also equal to the predicted probability of the language model (e.g., $P_{LM}$).

In addition to being combined with the blank predictor output, the encoder output is also processed by a projection layer (e.g., Proj.($h_t$)). A Softmax layer is also applied to the processed encoder output to generate a probability distribution of the encoder output.

The probability distribution of the encoder output (e.g., $z_t^V$) and the probability distribution of the vocabulary predictor output (e.g., $z_u^V$) are combined, where the probability distribution of the vocabulary predictor output is weighted with a learnable parameter (e.g., β). This process generates the prediction of the vocabulary token (e.g., $z_{t,u}^V$).

$$z_{t,u}^V = z_t^V + \beta z_u^V$$

The modified factorized neural transducer loss is computed by combining the loss from the transducer, the language model loss multiplied by a language model loss hyper-parameter, and the CTC loss multiplied by a CTC hyper-parameter, as represented by the following:

$$\mathcal{L} = \mathcal{L}_{transducer} + \lambda_{LM}\mathcal{L}_{LM} + \lambda_{CTC}\mathcal{L}_{CTC}$$

The inclusion of CTC criterion allows the encoder to behave more like an acoustic model.

Additionally, adding the CTC criterion during the training stage of the M-FNT, improves the accuracy of the M-FNT baseline as well as the M-FNT after adaptation to a new domain.

Notably, the modified factorized neural transducer 300 is able to be used in different domains, with different training data sets, and/or different target speakers that have different speaking styles because the model takes into account different acoustic properties of the different speaking styles in predicting vocabulary tokens without having to modify the language model based on these different acoustic attributes (i.e., the language model doesn't take into consideration the acoustic properties because it only consumes text data). Furthermore, the prediction of the label by the modified factorized neural transducer 300 is improved (i.e., higher accuracy; lower WER) using CTC when adapting the factorized neural transducer to a new domain.

Implementing KL Divergence

Figure 4:
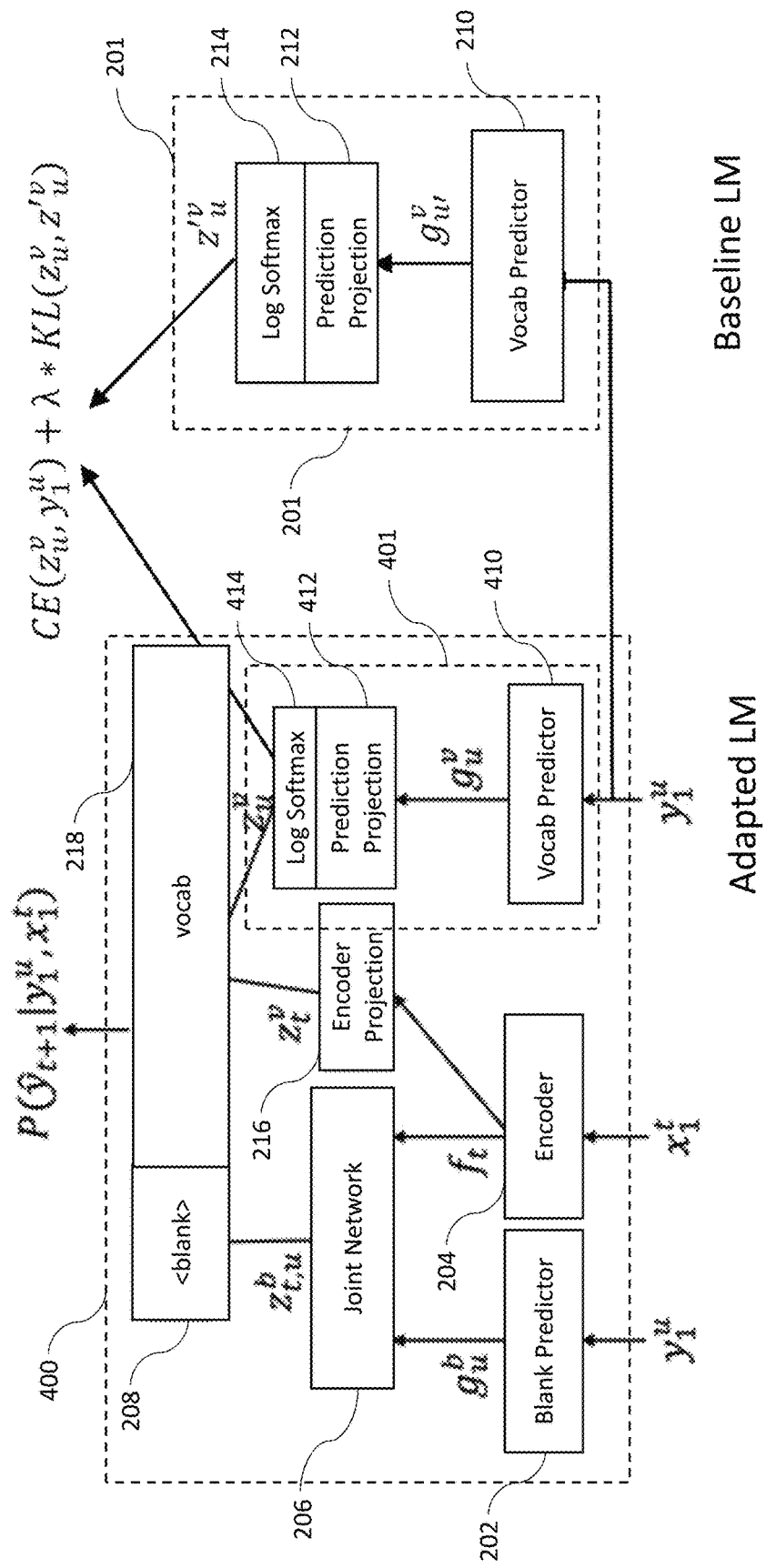
FIG. 4 illustrates an example of a modified factorized neural transducer using KL divergence.

Attention will now be directed to FIG. 4, which illustrates an example of a modified factorized neural transducer using KL divergence. For example, FIG. 4 illustrated a modified factorized neural transducer 400 which is a modified version of factorized neural transducer of FIG. 2. It should be appreciated that the following modification may also be made as a further modification to the modified factorized neural transducer 300 depicted in FIG. 3. The modified factorized neural transducer 400 illustrated in FIG. 4 is being adapted to a new domain, subsequent to baseline training for a baseline domain. The modified factorized neural transducer 400 is shown having the blank predictor 202, the encoder 204, and the joint network 206 which remain unmodified during/after adaptation. When the factorized neural transducer is adapted to a new domain, the language model 201, which is a baseline language model trained for a general, baseline domain, is adapted to a new domain using text-only adaptation data. Thus, the modified factorized neural transducer 400 is shown having an adapted language model 401 comprising a vocabulary predictor 410, prediction projection 412, and Softmax layer 414.

As described above, when a baseline ASR model is adapted to a new domain, the adapted ASR model sometimes loses its ability to accurately recognize speech in the baseline domain, although its ability to recognize speech in the new domain has improved. However, by implementing a KL divergence the output $z_u^v$ from adapted language model 401 is aligned with the output $z_u^v$ from the language model 201, so that the adapted language model 401 is able to predict vocabulary tokens with the same accuracy as the language model 201 (i.e., it does not lose the learned prediction for the baseline domain during adaptation to a new domain). The KL divergency measures the similarity between the different outputs and the model is able to account for any dissimilarity and adjust the subsequent token prediction accordingly.

In some instances, either output is based on input text associated with the baseline domain, adaptation text associated with the new domain, and/or adaptation text comprising text associated with both the baseline domain and the adaptation domain. In some instances, the output from the baseline model is combined with and/or aligned with the output from the adaptation model using a weighting factor on the baseline language model output. Overall, by taking advantage of the benefits of KL divergency, the modified factorized neural transducer 400 is able to achieve improved accuracy for predicting label for the new domain, while maintaining accuracy for predicting labels in the baseline domain.

Furthermore, the modified factorized neural transducer 400 is configured to be adapted with text-only data because only the language model needs to be adapted to the new domain. Because of this the adaptation process is streamlined because text-only data is easier to obtain than audio-text pairs that are typically required for adapting an ASR model.

Implementing N-Gram Interpolation

Figure 5:
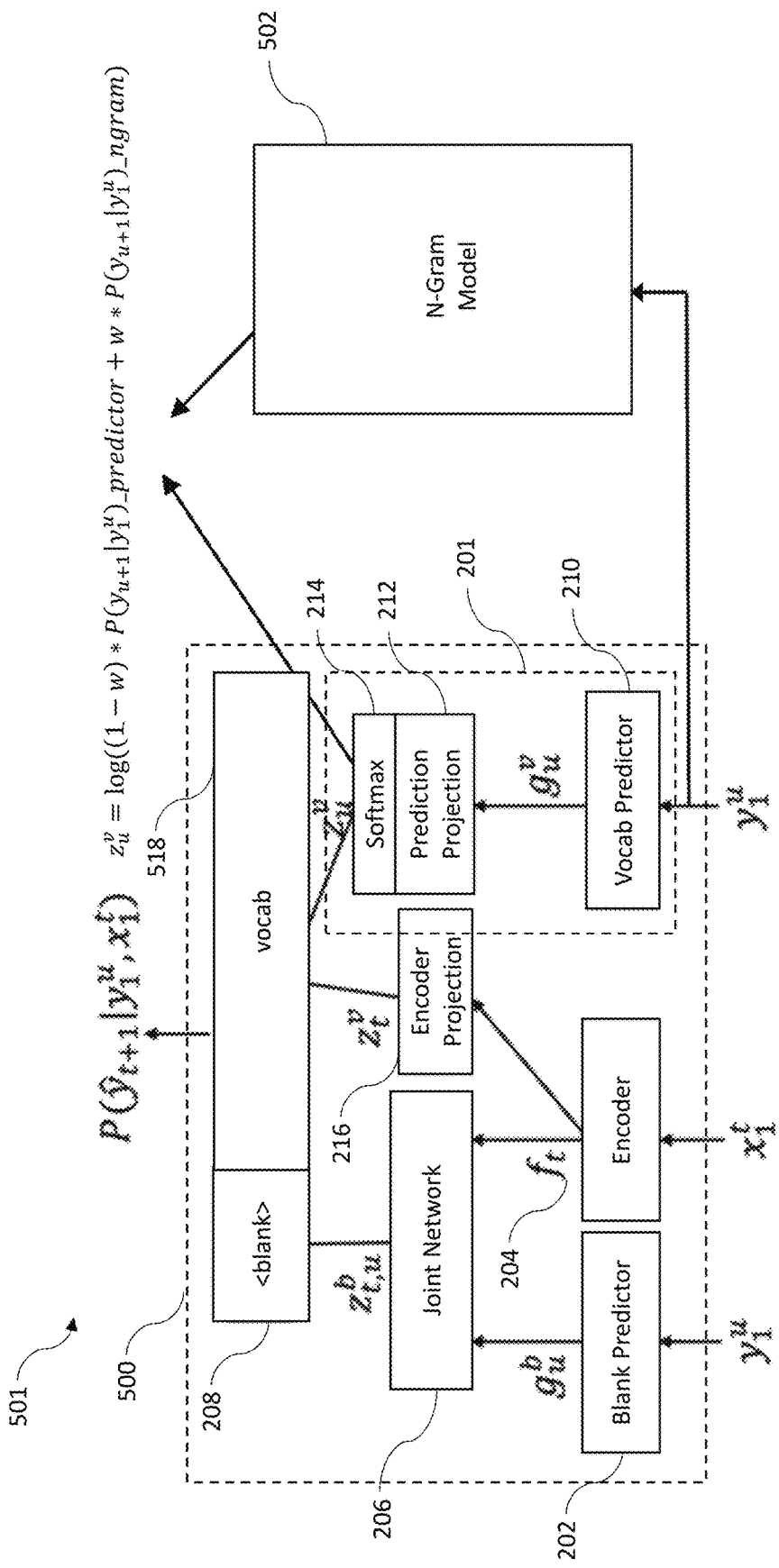
FIG. 5 illustrates an example of a modified factorized neural transducer using N-gram interpolation.

Attention will now be directed to FIG. 5, which illustrates an example of a modified factorized neural transducer using N-gram interpolation. The ASR system is shown having a factorized neural transducer 500, representative of factorized neural transducer 200 of FIG. 2, including the blank predictor 202, the encoder 204, and the joint network 206 which are used to predict blank tokens and the language model 201 which is used to predict vocabulary tokens. (The referenced N-gram interpolation can also be applied to the modified FNT of FIG. 3).

As illustrated in FIG. 5, an N-gram model 502 is used to augment the prediction of the vocabulary token 518. The N-gram model 502 is trained on a limited set of new adaptation data. The output from the N-gram model is then interpolated with the output from language model 201. By utilizing an N-gram model which is trained on the limited set of new adaptation data, the ASR system is able to achieve fast adaptation for predicting the vocabulary token in a new domain without having to modify and/or adapt the language model 201 inside the factorized neural transducer. The interpolation process improves the vocabulary token prediction for the new domain very quickly. Neural network adaptations typically require longer training times, require larger amounts of data, and require GPU processing. However, as illustrated in FIG. 5, the language model 201 does not have to be adapted because the N-gram models are able to process the new adaptation text data very quickly using only CPU processing and can be trained using limited sets of adaptation data.

As one example, users may wish to generate a transcription for a meeting using an ASR system based on the factorized neural transducer architecture. In this case, the factorized neural transducer has already been trained on a large amount of baseline or general training data. However, the users will be referencing a new document during the meeting. By implementing an N-gram interpolation, an N-gram model can be quickly trained on the set of adaptation data extracted from the new document, wherein output from the newly adapted N-gram model is interpolated with the output from the baseline language model included in the factorized neural transducer. In this manner, the factorized neural transducer (combining 500 and 502) is able to get more accurately predicted labels for speech terms associated with the new document as they are spoken by one or more of the users.

As another example, in some instances, the language model included in the factorized neural transducer has already been adapted to get the new domain (e.g., through vocabulary predictor fine-tuning or other neural network adaptation technique). Thus, in some instances, the factorized neural transducer 500 comprises a previously adapted language model, such as adapted language model 401 illustrated in FIG. 4, which has been adapted on an adaptation dataset previous to the set of new adaptation data. Thus, in some instances, the new document may include additional adaptation data, wherein the N-gram model 502 is trained on the additional adaptation data such that it further improves the vocabulary token predictions for the new domain. In some instances, the new document is an updated version of a document with which the factorized neural transducer has already been adapted. The system 501 can automatically identify differences between the old document and the updated document and extract a new set of adaptation data that represents only the changes between the two documents. The N-gram model 502 can then be trained on that new set of adaptation data to improve the vocabulary token prediction during run-time.

Because of the fast adaptation and input text facilitated by the N-gram model, system 501 is a highly dynamic automatic speech recognition system that can be adapted multiple times for different domains very quickly and for different contexts/circumstances. For example, when the system detects new data, the system can trigger the use of the N-gram interpolation for the new data. Additionally, in some instances, the system is configured to determine how much time it has for adapting itself to a new domain and/or how much adaptation data is available and deterministically select whether to implement an N-gram interpolation during run-time or implement a neural network adaptation technique prior to run-time. For example, if the system is able to access adaptation data with sufficient time prior to a meeting, it may select the neural network adaptation technique. On the other hand, if the system accesses adaptation data just prior or after the start of the meeting, it may selectively implement the N-gram interpolation. This makes system 501 highly versatile, responsive, and dynamic based on different automatic speech recognition scenarios.

Figure 6:
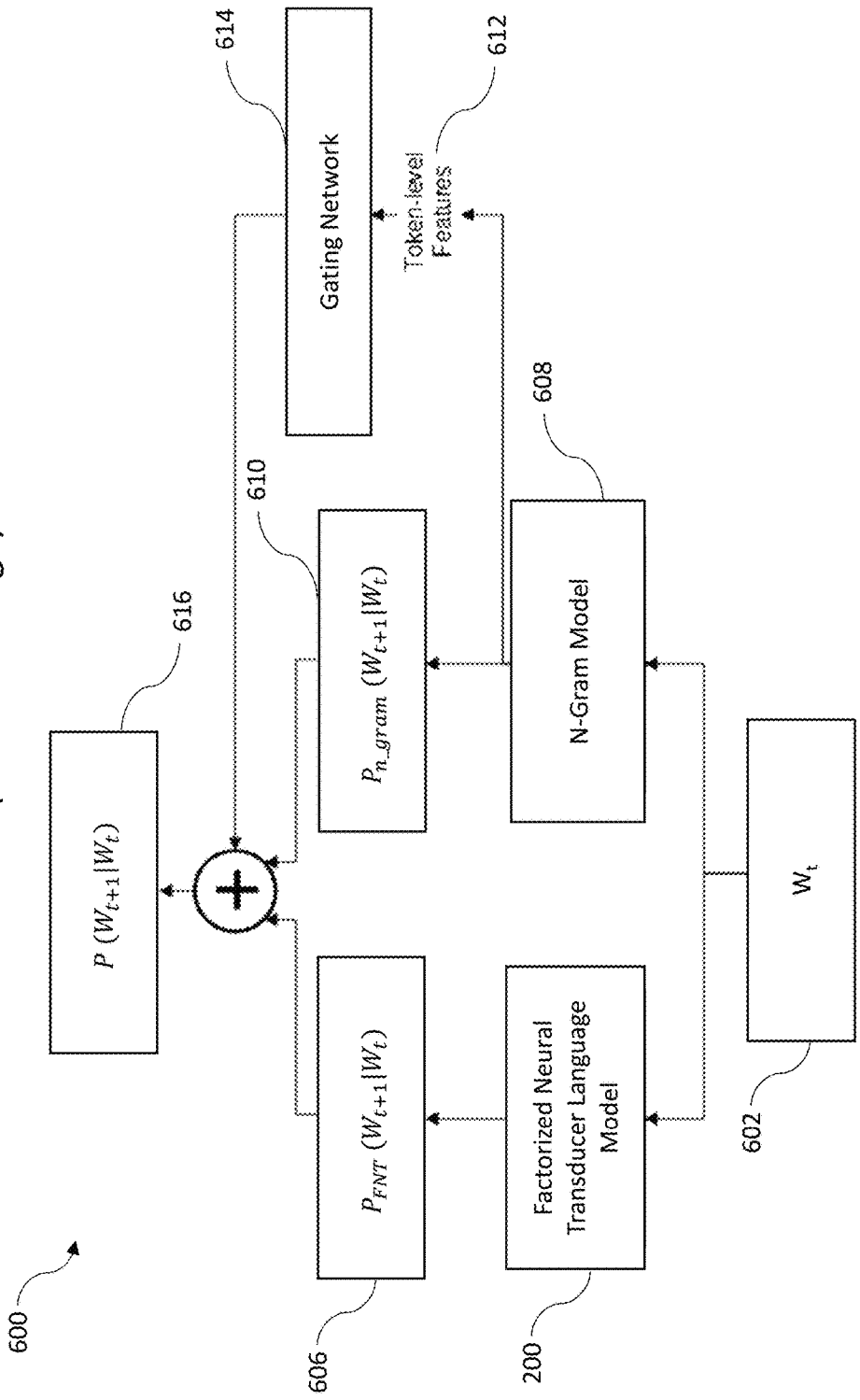
FIG. 6 illustrates an example of a modified factorized neural transducer using N-gram interpolation with a gating network.

Attention will now be directed to FIG. 6, which illustrates an example of a modified factorized neural transducer using N-gram interpolation with a gating network. System 600 is illustrated, wherein the input data 602 corresponds to a new domain is processed by the factorized neural transducer language model and an N-gram model 608, which is adapted on a new set of adaptation data associated with the new domain. A first output 606 from the factorized neural transducer is interpolated with a second output 610 from the N-gram model 608. Based on token-level features 612 of the N-gram output, the gating network 614 determines one or more interpolation weights (e.g., an interpolation weight for the first output and/or an interpolation weight for the second output) to be used in combining the different outputs in order to generate a final label output 616 for the input data 602.

This is a further improvement to the system 501 illustrated in FIG. 5. In system 501, the output from the N-gram model 502 is interpolated with the output from language model 201 using one or more pre-determined weights. However, by implementing a gating network (e.g., gating network 614), the different outputs are interpolated using dynamic weights which are determined at different time instants. The weights are determined based on up-to-date context of the text so that the resulting vocabulary prediction is optimized for the particular time instant. Thus, for every time instant, the gating network 614 predicts what the interpolation weight should be, thereby generating context-dependent interpolation weights which improve interpolated predictions. This improvement further improves the overall label prediction of the factorized neural transducer.

In some instances, the N-gram model is adapted on a very limited set of new adaptation data, for example, a set of medical terms. However, if a speaker uses one of these medical terms embedded into a phrase of general language (which the N-gram model is not trained on), the predictions given by the model are worse than the baseline model, because the baseline language model can understand general language better than the N-gram model. By implementing a gating network, the system 600 is able to mediate between the language model and the N-gram model to optimize the vocabulary token predictions for both the new medical terms and the general language included in the speaker's audio data.

Implementing an External Model

Figure 7:
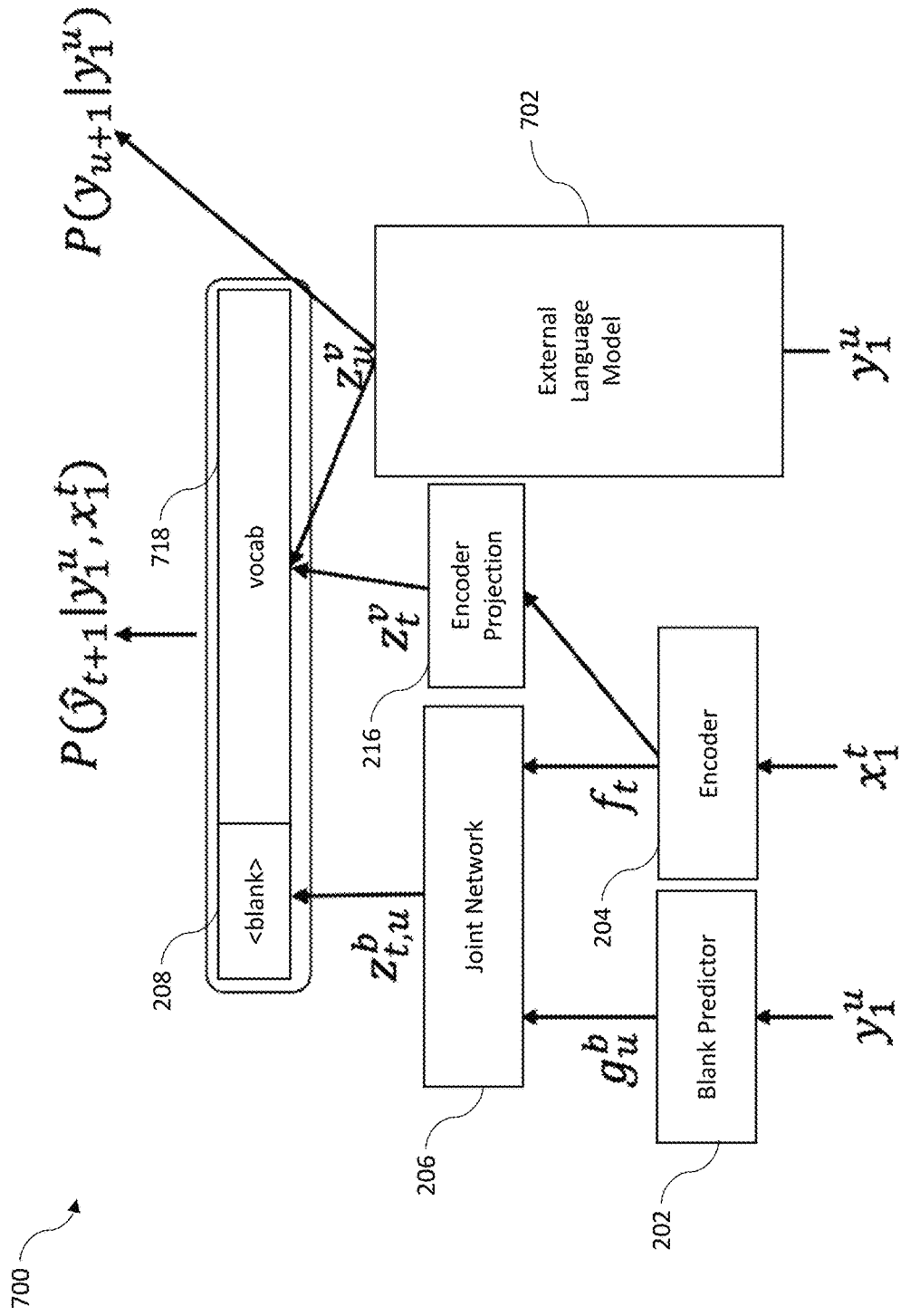
FIG. 7 illustrates an example of a modified factorized neural transducer where the vocabulary predictor and associated layers have been replaced with an external language model.

Attention will now be directed to FIG. 7, which illustrates an example of a modified factorized neural transducer where the vocabulary predictor and associated layers have been replaced with an external language model. For example, system 700 is shown having a similar set of layers for predicting the blank token 208 as factorized neural transducer 200 (e.g., the blank predictor 202, the encoder 204, and the joint network 206). However, in this system, the language model layers, including the vocabulary predictor, have been replaced with an external language model 702 that is a pre-trained and/or pre-adapted model. This external language model is trained on adaptation data, or more text data. The output from the external language model 702 and output from the encoder projection layer 216 are used to predict the vocabulary token 718.

In some instances, the external language model was frozen during factorized neural transducer training that occurred subsequent to replacing the vocabulary predictor. Alternatively, the external language model was further modified during subsequent factorized neural transducer training (i.e., not frozen). Experimental results showed that the external language model trained with more data improved the model accuracy. Updating the external language model further (e.g., as in during subsequent factorized neural transducer training and/or adaptation) further improved the ASR system.

Some disclosed embodiments are also directed to using a residual model to modify the factorized neural transducer and augment the prediction of the vocabulary tokens. A residual model is trained to model the differences between text included in baseline training data for a general domain and text included in adaptation data for a new domain. Because the residual model only has to model the differences, and not either of the entire sets of data, the residual model can comprise a limited number of parameters, which improves the speed at which the factorized neural transducer is able to be adapted to the new domain. This improves efficiency of the adaptation process because the language model of the factorized neural transducer does not have to be adapted/modified. Instead, output from the language model and output from the residual model are combined to improve the vocabulary token prediction.

Example Methods

Figure 8:
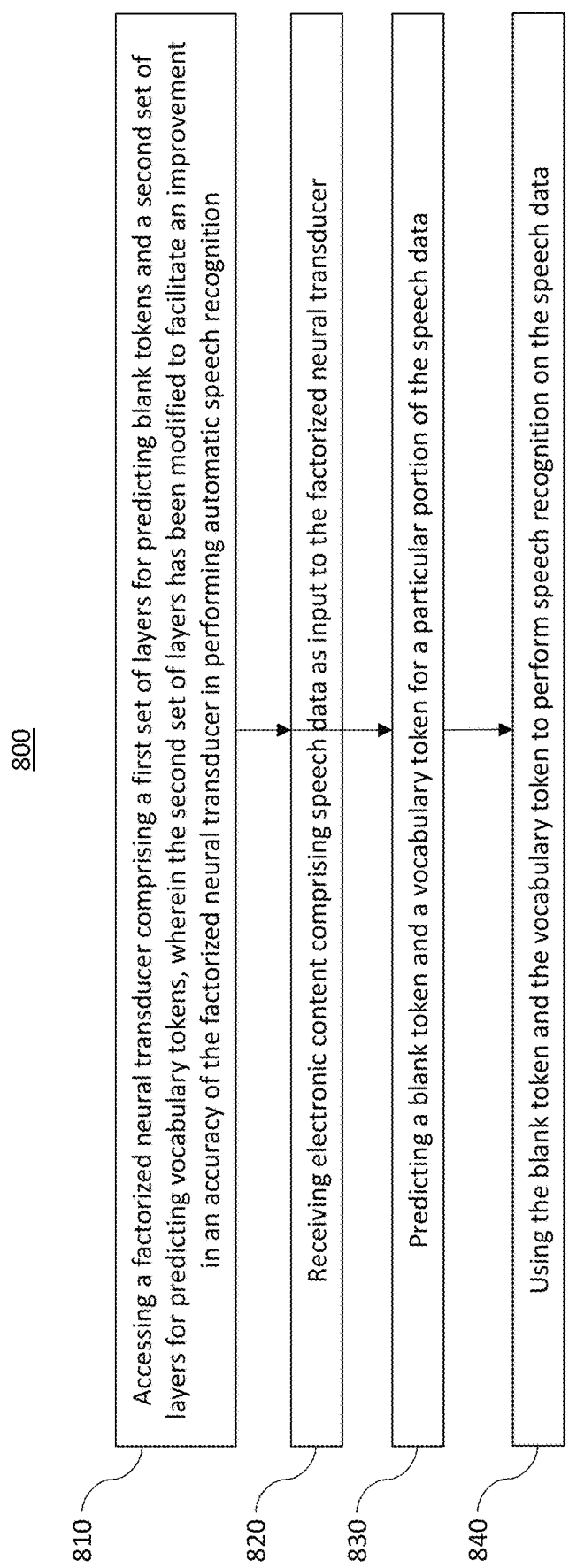
FIG. 8 illustrates one embodiment of a flow diagram having a plurality of acts associated with using a factorized neural transducer.

Attention will now be directed to FIG. 8, which illustrates a flow diagram 800 that includes various acts (act 810, act 820, act 830, and act 840) associated with exemplary methods that can be implemented by computing system 1010 for using a modified factorized neural transducer.

The first illustrated act includes a computing system accessing a factorized neural transducer comprising a first set of layers for predicting blank tokens and a second set of layers for predicting vocabulary tokens, wherein the second set of layers has been modified to facilitate an improvement in an accuracy of the factorized neural transducer in performing automatic speech recognition (act 810).

The first set of layers comprises a blank predictor, an encoder, and a joint network, wherein a blank predictor output from the blank predictor and an encoder output from the encoder are processed by the joint network for predicting the blank tokens. The second set of layers comprises language model which includes a vocabulary predictor which is a separate predictor from the blank predictor, wherein a vocabulary predictor output from the vocabulary predictor and the encoder output are used for predicting the vocabulary tokens.

By factorizing the blank prediction network and the vocabulary prediction network, the vocabulary prediction network (e.g., the second set of layers) is able to behave more like a standalone language model, which can be modified and/or adapted without having to modify or adapt the blank prediction network. This allows for greater flexibility and variety in the way the vocabulary prediction network can be modified and/or adapted. For example, the vocabulary prediction network can be adapted to a new domain using text-only data, as opposed to needing audio-text pairs. This also allows for fast adaptation techniques which do not require modifying the language model.

The computing system receiving electronic content comprising speech data as input to the factorized neural transducer (act 820). In response to receiving the electronic content, the computing system predicts a blank token and a vocabulary token for a particular portion of the speech data (act 830). Finally, the computing system uses the blank token and the vocabulary token to perform speech recognition on the speech data (i.e., generate a final output label for the particular portion of speech).

As described above, disclosed embodiments are directed to a plurality of methods to modify the factorized neural transducer, in particular the second set of layers of the factorized neural transducer. Disclosed embodiments are directed to improved training techniques, improved adaptation techniques, and improved run-time techniques, particularly in facilitating an improvement in performing speech recognition on input speech associated with a new domain.

In some instances, the baseline training of the factorized neural model is improved by modifying the second set of layers. For example, the computing system trains the factorized neural transducer using CTC criterion to train the factorized neural transducer to acoustically align the encoder output and the vocabulary predictor output. This improves the vocabulary prediction token by utilizing the acoustic analysis to account for different combinations of mapping the label sequence from the vocabulary prediction output into the speech space. This also allows the factorized neural model to better combine the encoder output and the vocabulary predictor output, by combining the outputs prior to being used to predict the vocabulary token.

In some instances, the adaptation of the factorized neural transducer is improved by modifying the second set of layers. For example, in some embodiments, the second set of layers comprises a baseline language model and an adapted language model. The second set of layers has is modified by applying a KL divergence processing between a first output of the baseline language model and a second output of the adapted language model to generate a modified vocabulary predictor output to be used in predicting the vocabulary token. By aligning the adapted language model output with the baseline language model output, the adapted factorized neural transducer better retains learned information in the baseline domain, while realizing an improvement in the predicting label output in the new domain for which its language model has been adapted.

In some instances, the second set of layers is modified to improve a run-time adaptation of the factorized neural transducer in performing speech recognition for speech associated with a new domain. For example, the computing system obtains a set of adaptation data associated with the new domain, accesses an N-gram model trained on the set of adaptation data, generates an N-gram output based on receiving the particular portion of speech data, and prior to predicting the vocabulary token, interpolates the N-gram output from the N-gram model with the vocabulary predictor output.

By implementing an N-gram model, the factorized neural model is able to modify the second set of layers (i.e., integrating output from the N-gram model and the language model) without modifying the language model or the first set of layers, while realizing an improvement in the vocabulary token prediction and subsequent final output label.

In some instances, the computing system also generates a first language model score associated with the vocabulary predictor and a second language model score associated with the N-gram model and combines the first language model score with the second language model score. Prior to interpolating the N-gram output with the vocabulary predictor output, the computing system applies a first weight to the N-gram output and a second weight to the vocabulary predictor output. Further benefits are realized when the computing system uses a gating network to interpolate a first output from the N-gram model with the vocabulary predictor output, such that the first weight and the second weight are dynamically updated by the gating network based on a context associated with the particular portion of speech data.

In some embodiments, the second set of layers is modified by replacing the vocabulary prediction network included in the second set of layers with an external language model. For example, the system accesses an external language model previously trained on text data (i.e., adaptation data for the new domain) and predicts the vocabulary token at least based on an output generated by the external language model and the encoder output. The computing system can also utilize a residual model which models the difference between the baseline training data and the adaptation date to improve the vocabulary predictor output.

Figure 9:
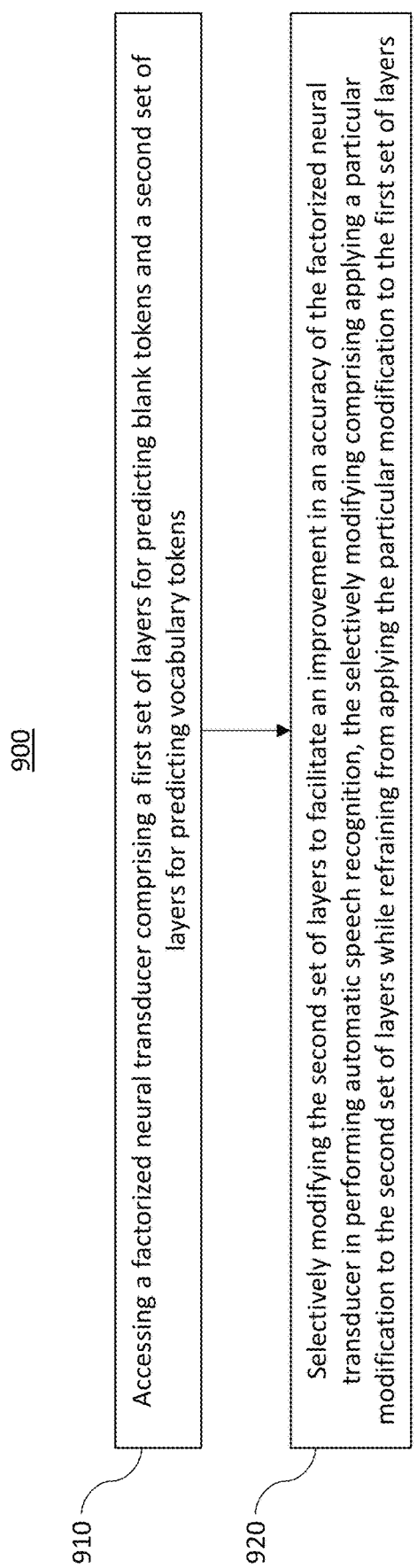
FIG. 9 illustrates one embodiment of a flow diagram having a plurality of acts associated with modifying a factorized neural transducer.

Attention will now be directed to FIG. 9 illustrates a flow diagram 900 that includes various acts (act 910 and act 920) associated with exemplary methods that can be implemented by computing system 1010 for modifying a factorized neural transducer to improve an accuracy in performing automatic speech recognition.

The first illustrated act includes a computing system accessing a factorized neural transducer comprising a first set of layers for predicting blank tokens and a second set of layers for predicting vocabulary tokens (act 910). By factorizing the blank prediction network and the vocabulary prediction network, the vocabulary prediction network is able to behave more like a standalone language model, which can be modified and/or adapted without having to modify or adapt the blank prediction network. This allows for greater flexibility and variety in the way the vocabulary prediction network can be modified and/or adapted. For example, the vocabulary prediction network can be adapted to a new domain using text-only data, as opposed to needing audio-text pairs as training data.

The computing system also selectively modifies the second set of layers to facilitate an improvement in an accuracy of the factorized neural transducer in performing automatic speech recognition, wherein the selectively modifying comprising applying a particular modification to the second set of layers while refraining from applying the particular modification to the first set of layers (act 910). There are a variety of different ways in which the computing system can modify the second set of layers.

The computing system can also detect various attributes of the context of the input text data in order to determine and select which modification technique to use. For example, if the system detects new adaptation data in the input text, the system may obtain further adaptation on the language model. However, if time is limited for the adaptation process, the system may implement an N-gram model, as described below, during run-time. In some instances, where the input text comprises both new adaptation terms within baseline domain language, the system can implement a KL divergency function to prevent baseline knowledge loss during adaptation. If there is limited time to adapt the transducer, the system can implement an N-gram model with a gating network to guide how to combine knowledge from the baseline language model and the adapted N-gram model.

In some instances, predicting the vocabulary token further comprises projecting the acoustic representation, computing an acoustic probability distribution of the acoustic representation, generating a vocabulary representation for the portion of speech data based on the previously predicted non-blank output, projecting the vocabulary representation, computing a vocabulary probability distribution of the vocabulary representation, and combining the acoustic probability distribution and the vocabulary probability distribution for predicting the vocabulary token. By processing the acoustic representation and the vocabulary predictor output in this manner, the factorized neural transducer is able to implement CTC criterion which improve the training and/or adaptation processes, as well as improve the accuracy of the vocabulary token prediction.

Thus, in some instances, the selectively modifying the second set of layers comprises incorporating CTC criterion into the second set of layers to train the factorized neural transducer to acoustically align the encoder output and the vocabulary predictor output during training. Additionally, in such instances, the selectively modifying the second set of layers comprises modifying the second set of layers to cause the factorized neural transducer to combine the encoder output and the vocabulary predictor output prior to being used to predict the vocabulary token. This improves the accuracy of the vocabulary token prediction by accounting for acoustic information learned by the encoder, in addition to the language information learned by the vocabulary predictor.

Some embodiments are directed to improving the adaptation of the factorized neural transducer to a new domain. For example, in some instances, the second set of layers comprises a baseline language model and an adapted language model, such that the selectively modifying the second set of layers comprises incorporating a KL divergency between a first output of the baseline language model and a second output of the adapted language model. By implementing a KL divergency function, the factorized neural transducer is able to retain accuracy it achieved during baseline training for the baseline domain, while realizing an improvement in accuracy for the new adaptation domain.

In some instances, fast adaptation techniques are required, which can occur just prior and/or during run-time. Because of the factorization of the vocabulary prediction network and blank predictor network, the computing system is able to access an N-gram based language model previously trained with adaptation data and selectively modify the second set of layers by integrating the N-gram based language model into the second set of layers to cause a first output from the N-gram based language model to be interpolated with a second output from the vocabulary predictor during decoding.

To further improve the accuracy and flexibility of the factorized neural transducer, the computing system accesses a gating network configured to generate dynamic interpolation weights, wherein the selectively modifying the second set of layers comprises integrating the gating network into the second set of layers to cause output from N-gram based language model to be interpolated with the vocabulary predictor output using the dynamic interpolation weights.

The computing system can also use other external models to improve the accuracy of the factorized neural transducer in performing speech recognition, particular for new domains. For example, the computing system accesses an external language model previously trained on adaptation data. The selectively modifying the second set of layers comprises replacing one or more layers of the second set of layers with the external language model, such that the factorized neural transducer is configured to predict the vocabulary token at least based on output from the external language model. In some instances, the external language model is frozen during subsequent training of the factorized neural transducer, while in other instances the external language model is further modified during subsequent training. Additionally, an external language model could also be trained with more text data than the data originally used to train the factorized neural transducer model. This facilitates a further improvement in the accuracy for the general testing set.

In view of the foregoing, it will be appreciated that the disclosed embodiments provide many technical benefits over conventional systems and methods for generating and modifying machine learning models for performing speech recognition using a modified factorized neural transducer. By implementing the disclosed embodiments in this manner, many technical advantages over existing systems are realized, including the ability to generate factorized neural transducers which comprise separate prediction networks for predicting blank tokens and vocabulary tokens.

Additionally, system and methods provided herein are directed to embodiments for further modifying the factorized neural transducer including, but not limited to: (1) implementing CTC criterion into the training process to provide for more efficient training processes, with improved prediction functionality; (2) combining the encoder output and vocabulary predictor output prior to generating the vocabulary token prediction to allow learned acoustic information to improve the prediction of the vocabulary token; (3) applying a KL divergence processing between the output of the baseline language model of the factorized neural transducer and the output of the adapted language model of the factorized neural transducer to mitigate degradation of the factorized neural transducer recognizing speech in the baseline domain after being adapted to the new domain; (4) interpolating output from the language model of the factorized neural transducer and an N-gram model during run-time of the factorized neural transducer to facilitate an improvement in predicting vocabulary tokens for speech associated with a new domain; (5) replacing in the baseline language model of the factorized neural transducer with an external language model; and/or (6) using a residual model to model the differences between the training data and new adaptation data to quickly adapt the factorized neural transducer by combining output from the residual model and the vocabulary predictor output. The foregoing benefits are especially pronounced in ASR applications requiring fast adaptation, such as in real-time and/or streaming audio scenarios.

Example Computing Systems

Figure 10:
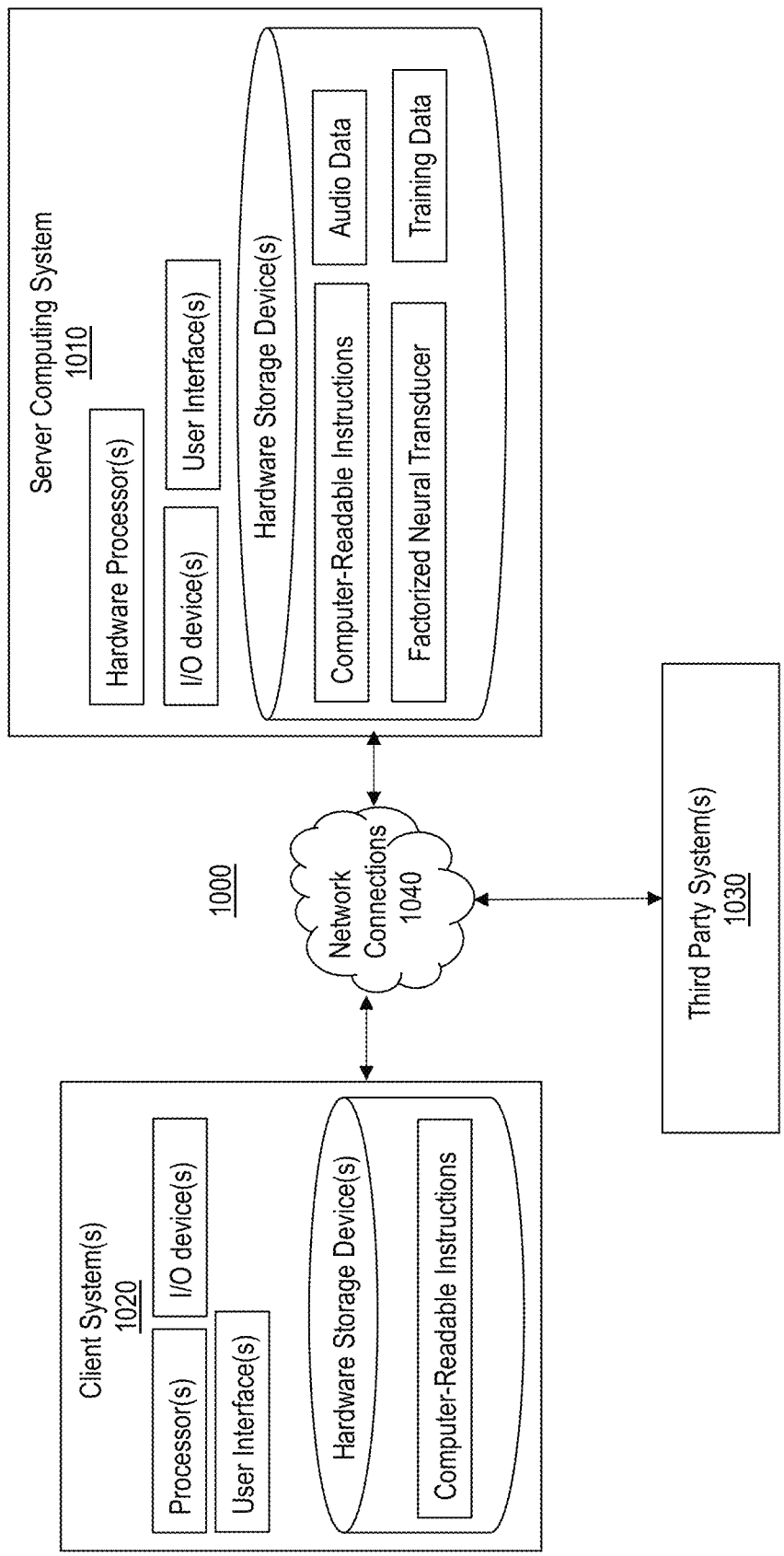
FIG. 10 illustrates an example computing environment in which a computing system incorporates and/or is utilized to perform disclosed aspects of the disclosed embodiments.

Attention will be first directed to FIG. 10, which illustrates the computing system 1010 as part of a computing environment 1000 that includes client system(s) 1020 and third-party system(s) 1030 in communication (via a network 1040) with the computing system 1010. As illustrated, computing system 1010 is a server computing system configured to compile, modify, and implement a factorized neural transducer configured to perform speech recognition.

The computing system 1010, for example, includes one or more processor(s) (such as one or more hardware processor(s) and one or more hardware storage device(s) storing computer-readable instructions. One or more of the hardware storage device(s) is able to house any number of data types and any number of computer-readable instructions by which the computing system 1010 is configured to implement one or more aspects of the disclosed embodiments when the computer-readable instructions are executed by the one or more hardware processor(s). The computing system 1010 is also shown including user interface(s) and input/output (I/O) device(s).

As shown in FIG. 10, hardware storage device(s) is shown as a single storage unit. However, it will be appreciated that the hardware storage device(s) is, a distributed storage that is distributed to several separate and sometimes remote systems and/or third-party system(s). The computing system 1010 can also comprise a distributed system with one or more of the components of computing system 1010 being maintained/run by different discrete systems that are remote from each other and that each perform different tasks. In some instances, a plurality of distributed systems performs similar and/or shared tasks for implementing the disclosed functionality, such as in a distributed cloud environment.

In some instances, the audio data is natural language audio and/or synthesized audio data. Input audio data is retrieved from previously recorded files such as video recordings having audio or audio-only recordings. Some examples of recordings include videos, podcasts, voicemails, voice memos, songs, etc. Audio data is also retrieved from actively streaming content which is live continuous speech such as a news broadcast, phone call, virtual or in-person meeting, etc. In some instances, a previously recorded audio file is streamed. Natural audio data is recorded from a plurality of sources, including applications, meetings comprising one or more speakers, ambient environments including background noise and human speakers, etc. It should be appreciated that the natural language audio comprises one or more spoken languages of the world's spoken languages. Thus, the factorized neural transducer is trainable in one or more languages.

The training data for the baseline factorized neural transducer comprises spoken language utterances (e.g., natural language and/or synthesized speech) and corresponding textual transcriptions (e.g., text data). The training data comprises text data and natural language audio and simulated audio that comprises speech utterances corresponding to words, phrases, and sentences included in the text data. In other words, the speech utterances are the ground truth output for the text data input. Training data also includes adaptation data which comprises text-only data for new domains on which factorized neural transducer can be adapted.

The computing system is in communication with client system(s) 1020 comprising one or more processor(s), one or more user interface(s), one or more I/O device(s), one or more sets of computer-readable instructions, and one or more hardware storage device(s). In some instances, users of a particular software application (e.g., Microsoft Teams) engage with the software at the client system which transmits the audio data to the server computing system to be processed, wherein the predicted labels are displayed to the user on a user interface at the client system. Alternatively, the server computing system is able to transmit instructions to the client system for generating and/or downloading a factorized neural transducer model, wherein the processing of the audio data by the model occurs at the client system.

The computing system is also in communication with third-party system(s). It is anticipated that, in some instances, the third-party system(s) 1030 further comprise databases housing data that could be used as training data, for example, text data not included in local storage. Additionally, or alternatively, the third-party system(s) 1030 include machine learning systems external to the computing system 1010.

Embodiments of the present invention may comprise or utilize a special purpose or general-purpose computer (e.g., computing system 1010) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) of FIG. 10) that store computer-executable/computer-readable instructions are physical hardware storage media/devices that exclude transmission media. Computer-readable media that carry computer-executable instructions or computer-readable instructions in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 1040 of FIG. 10) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for performing improved automatic speech recognition using a factorized neural transducer, the method comprising:
   accessing a factorized neural transducer comprising a first set of layers for predicting blank tokens and a second set of layers for predicting vocabulary tokens, wherein the second set of layers has been modified to facilitate an improvement in an accuracy of the factorized neural transducer in performing automatic speech recognition,
      the first set of layers comprising a blank predictor, an encoder, and a joint network, wherein a blank predictor output from the blank predictor and an encoder output from the encoder are processed by the joint network for predicting a blank token,
      the second set of layers comprising a language model that comprises a vocabulary predictor which is a separate predictor from the blank predictor, wherein a vocabulary predictor output from the vocabulary predictor and the encoder output are used for predicting a vocabulary token;
   receiving electronic content comprising speech data as input to the factorized neural transducer;
   predicting a blank token and a vocabulary token for a particular portion of the speech data, the particular portion of speech data associated with a new domain;
   obtaining a set of adaptation data associated with the new domain;
   accessing an N-gram model trained on the set of adaptation data;
   generating an N-gram output based on receiving the particular portion of speech data; and
   prior to predicting the vocabulary token, interpolating the N-gram output from the N-gram model with the vocabulary predictor output; and
   using the blank token and the vocabulary token to perform speech recognition on the speech data.

2. The method of claim 1, further comprising:
   training the factorized neural transducer using at least connectionist temporal classification (CTC) criterion to train the factorized neural transducer to acoustically align the encoder output and the vocabulary predictor output.

3. The method of claim 1, further comprising:
   combining the encoder output and the vocabulary predictor output prior to being used to predict the vocabulary token.

4. The method of claim 1,
   wherein the second set of layers comprises a baseline language model and an adapted language model, and
   wherein the second set of layers has been modified by applying a (Kullback-Leibler) KL divergence processing between a first output of the baseline language model and a second output of the adapted language model to generate a modified vocabulary predictor output to be used in predicting the vocabulary token.

5. The method of claim 1, further comprising:
   generating a first language model score associated with the vocabulary predictor and a second language model score associated with the N-gram model; and
   combining the first language model score with the second language model score.

6. The method of claim 1, further comprising:
   prior to interpolating the N-gram output with the vocabulary predictor output, applying a first weight to the N-gram output and a second weight to the vocabulary predictor output.

7. The method of claim 6, further comprising:
   using a gating network to interpolate a first output from the N-gram model with the vocabulary predictor output, such that the first weight and the second weight are dynamically updated by the gating network based on a context associated with the particular portion of speech data.

8. The method of claim 1, further comprising:
   accessing an external language model previously trained on text data; and
   predicting the vocabulary token at least based on an output generated by the external language model and the encoder output.

9. A computing system comprising:
   A hardware processor; and
   A hardware storage device storing computer-executable instructions that are executable by the hardware processor for implementing a method for improving an accuracy of a factorized neural transducer for performing automatic speech recognition, wherein the method comprises the computing system performing the following:
   accessing a factorized neural transducer comprising a first set of layers for predicting blank tokens and a second set of layers for predicting vocabulary tokens,
      the first set of layers comprising a blank predictor, an encoder, and a joint network, wherein a blank predictor output from the blank predictor and an encoder output from the encoder are processed by the joint network for predicting a blank token,
      the second set of layers comprising a baseline language model and an adapted language model, the baseline language model comprising a first vocabulary predictor separate from the blank predictor and the adapted language model comprising a second vocabulary predictor that is separate from the blank predictor, wherein output of the adapted language model is aligned with output from the baseline language model to generate a modified vocabulary predictor output that is used with the encoder output for predicting a vocabulary token, wherein the second set of layers has been modified by applying a (Kullback-Leibler) KL divergence processing between a first output of the baseline language model and a second output of the adapted language model to generate a modified vocabulary predictor output to be used in predicting the vocabulary token; and receiving electronic content comprising speech data as input to the factorized neural transducer;

predicting a blank token and a corresponding vocabulary token for a particular portion of the speech data; and using the blank token and the vocabulary token to perform speech recognition on the speech data.

10. The computing system of claim 9, wherein the method further includes selectively modifying the second set of layers comprises incorporating connectionist temporal classification (CTC) criterion into the second set of layers to train the factorized neural transducer to acoustically align the encoder output and the vocabulary predictor output during training.

11. The computing system of claim 9, wherein the selectively modifying the second set of layers comprises modifying the second set of layers to cause the factorized neural transducer to combine the encoder output and the vocabulary predictor output prior to being used to predict the vocabulary token.

12. The computing system of claim 9, wherein the alignment of the output of the adapted language model with the output from the baseline language model is performed by incorporating a (Kullback-Leibler) KL divergency between a first output of the baseline language model and a second output of the adapted language model.

13. The computing system of claim 9, further comprising:
accessing an external language model previously trained on adaptation data; and
wherein the selectively modifying the second set of layers comprises replacing one or more layers of the second set of layers with the external language model, such that the factorized neural transducer is configured to predict the vocabulary token at least based on output from the external language model.

14. The computing system of claim 13, wherein the external language model is frozen during subsequent training of the factorized neural transducer.

15. A computing system comprising:
A hardware processor; and
A hardware storage device storing computer-executable instructions that are executable by the hardware processor for implementing a method for improving an accuracy of a factorized neural transducer for performing automatic speech recognition, wherein the method comprises the computing system performing the following:

accessing a factorized neural transducer comprising a first set of layers for predicting blank tokens and a second set of layers for predicting vocabulary tokens, the first set of layers comprising a blank predictor, an encoder, and a joint network, wherein a blank predictor output from the blank predictor and an encoder output from the encoder are processed by the joint network for predicting a blank token, the second set of layers comprising a language model that includes a vocabulary predictor which is a separate predictor from the blank predictor, wherein a vocabulary predictor output from the vocabulary predictor and the encoder output are used for predicting a vocabulary token; and selectively modifying the second set of layers to facilitate an improvement in an accuracy of the factorized neural transducer in performing automatic speech recognition, the selectively modifying comprising applying a particular modification to the second set of layers while refraining from applying the particular modification to the first set of layers, and by incorporating connectionist temporal classification (CTC) criterion into the second set of layers to train the factorized neural transducer to acoustically align the encoder output and the vocabulary predictor output during training.

16. The computing system of claim 15, wherein the selectively modifying the second set of layers comprises modifying the second set of layers to cause the factorized neural transducer to combine the encoder output and the vocabulary predictor output prior to being used to predict the vocabulary token.

* * * * *